US012593011B2

(12) United States Patent
Lanza et al.

(10) Patent No.: US 12,593,011 B2
(45) Date of Patent: Mar. 31, 2026

(54) APPARATUS AND METHODS FOR VISUAL SUMMARIZATION OF VIDEOS

(71) Applicant: Video Notebook Inc., Menlo Park, CA (US)

(72) Inventors: Michael Lanza, Menlo Park, CA (US); Eran Steinberg, San Francisco, CA (US)

(73) Assignee: Video Notebook Inc., Menlo Park, CA (US)

( * ) Notice: Subject to any disclaimer, the term of this patent is extended or adjusted under 35 U.S.C. 154(b) by 243 days.

(21) Appl. No.: 18/634,280

(22) Filed: Apr. 12, 2024

(65) Prior Publication Data

US 2024/0357060 A1 Oct. 24, 2024

Related U.S. Application Data

(60) Provisional application No. 63/460,526, filed on Apr. 19, 2023.

(51) Int. Cl.
H04N 7/15 (2006.01)
G06V 10/70 (2022.01)

(52) U.S. Cl.
CPC ............. H04N 7/155 (2013.01); G06V 10/70 (2022.01)

(58) Field of Classification Search
None
See application file for complete search history.

(56) References Cited

U.S. PATENT DOCUMENTS

| 10,459,975 | B1 * | 10/2019 | Malpani | ................ | G06F 16/735 |
| 11,095,468 | B1 * | 8/2021 | Pandey | ............... | H04L 12/1831 |
| 11,355,155 | B1 * | 6/2022 | Chen | .................... | H04N 21/251 |
| 12,518,748 | B1 * | 1/2026 | Liang | .................... | G10L 15/183 |
| 2022/0215052 | A1 * | 7/2022 | Chalana | .................. | G06N 3/08 |
| 2022/0353101 | A1 * | 11/2022 | Hu | ....................... | H04L 12/1822 |
| 2023/0035155 | A1 * | 2/2023 | Huang | .................. | G06F 40/166 |
| 2023/0230589 | A1 * | 7/2023 | Giovanardi | ........... | G06F 40/279 |
| | | | | | 704/232 |
| 2025/0165728 | A1 * | 5/2025 | Du | ...................... | G10L 15/1815 |

FOREIGN PATENT DOCUMENTS

WO      WO-2006092752 A2 *   9/2006    ............. G11B 27/28

* cited by examiner

*Primary Examiner* — Quoc D Tran
(74) *Attorney, Agent, or Firm* — Levine Bagade Han LLP

(57) ABSTRACT generally comprises obtaining one or more images from the video as the video is played, locating a presence of a shape or text from each of the one or more images, determining whether the shape or text corresponds to a prior shape or text from a prior base image, determining whether each of the one or more images comprises a corresponding slide, presenting the one or more images as one or more slides upon an interface displayed to a user, providing a timestamp upon each of the one or more slides, whereby selection of the timestamp by the user plays the video at a location which correlates to the timestamp within the video, and presenting the one or more slides including the timestamp to the user.

36 Claims, 11 Drawing Sheets

102

APPARATUS AND METHODS FOR VISUAL SUMMARIZATION OF VIDEOS

CROSS-REFERENCE TO RELATED APPLICATIONS

This application claims the benefit of priority to U.S. Prov App. 63/460,526 filed Apr. 19, 2023, which is incorporated herein by reference in its entirety.

FIELD OF THE INVENTION

The present invention relates generally to the field of video and online meeting summaries and encompasses the development and application of techniques, tools, and methodologies to condense and extract key information from video content and virtual meetings.

INCORPORATION BY REFERENCE

All publications and patent applications mentioned in this specification are herein incorporated by reference to the same extent as if each such individual publication or patent application were specifically and individually indicated to be so incorporated by reference.

BACKGROUND OF THE INVENTION

The increasing prevalence of videos and online meetings in various aspects of life has introduced several challenges, necessitating the need for effective summarization:

Information Overload: As digital content proliferates, individuals face an overwhelming amount of information. Lengthy videos and meetings contribute to this overload, making it difficult for viewers or participants to extract the most relevant information efficiently.

Time Constraints: Modern lifestyles are characterized by busy schedules and limited time. Watching or attending long videos and meetings may not be feasible for many people.

Attention Span: In an era of constant digital distractions, maintaining focus for extended periods is challenging. Lengthy videos and meetings can strain attention spans, causing viewers or participants to disengage or lose interest, ultimately diminishing the effectiveness of communication.

Retention and Comprehension: Cognitive limitations affect individuals' ability to process and retain large amounts of information. Without effective summarization, viewers or participants may struggle to grasp key concepts or remember important details from lengthy videos and meetings.

Nonlinear Brains: People no longer have much ability to passively follow a linear presentation from beginning to end. They demand to jump around and control the order of presentation. A visual summary of a video enables people to scan the essential parts of a video quickly, and watch the video in small pieces, in any order they wish.

Searchability and Navigation: Locating specific information within lengthy videos or meeting recordings can be time-consuming and inefficient. Lack of clear organization and indexing makes it challenging for users to find relevant content, leading to frustration and wasted time.

Evaluation and Feedback: In educational or professional contexts, assessing comprehension and providing feedback relies on clear communication and understanding of the material. Lengthy videos and meetings complicate this process, making it harder for instructors, trainers, or supervisors to evaluate participants' understanding and provide meaningful feedback.

These challenges underscore the critical need for effective summarization techniques to address the shortcomings of lengthy videos and online meetings, ensuring that valuable information is accessible, comprehensible, and actionable for all stakeholders.

There is a clear need to generate an efficient way for users to summarize, store, notate, search, organize, collaborate and share presentations and videos, condensing the overall time into a concise form.

SUMMARY OF THE INVENTION

A "video," as referred to herein, may be a prerecorded video (such as a YouTube video), a live event presented in video format, a live virtual meeting (such as a Zoom meeting) etc.

The video visual summarization system disclosed herein has the ability to summarize videos into concise visual slides along with associated comments, summaries and/or links to the original video. The video summary is much easier to digest quickly, so that the user can ascertain the important points, along with associated visuals, of the video much more quickly than watching the entire video. This summary may be performed automatically by the system. A viewer may also add to the video summary with his/her own screenshots and comments.

The visual summarization systems disclosed herein include several features, including:

Slide identification and capture
        i. Identification and capture of slide markups
        ii. Identification and capture of slide build sequences
    Dynamic Information-rich Visual Image (DIVI) identification and capture
    Key slides/chapters identification and capture
    Participant identification and capture
    Participant response identification and capture
    Participant comments summarization
    Storing and organizing video summaries
    Searching video summaries
    Sharing video summaries
    Connecting to other productivity tools One method for visually summarizing a video may generally comprise obtaining one or more images from the video as the video is played, locating a presence of a shape or text from each of the one or more images, determining whether the shape or text corresponds to a prior shape or text from a prior base image, determining whether each of the one or more images comprises a corresponding slide, presenting the one or more images as one or more slides upon an interface displayed to a user, providing a timestamp upon each of the one or more slides, whereby selection of the timestamp by the user plays the video at a location which correlates to the timestamp within the video, and presenting the one or more slides including the timestamp to the user.

In another aspect of the method for visually summarizing a video, the method may also comprise obtaining the one or more images comprises automatically obtaining the one or more images at a predetermined time interval.

In another aspect of the method for visually summarizing a video, obtaining the one or more images may comprise manually obtaining the one or more images when actuated by the user to create the corresponding slide.

In another aspect of the method for visually summarizing a video, obtaining the one or more images may comprise obtaining the one or more images from a dynamic information-rich visual image video comprising a plurality of images to create the corresponding slide.

In another aspect of the method for visually summarizing a video, obtaining the one or more images may comprise obtaining the one or more images from one or more build images to create the corresponding slide comprising a build sequence slide.

In another aspect of the method for visually summarizing a video, the method may further comprise obtaining auditory or textual information from the one or more images prior to presenting the one or more slides.

In another aspect of the method for visually summarizing a video, the method may further comprise generating a summary of the auditory or textual information.

In another aspect of the method for visually summarizing a video, the summary is generated as a transcript.

In another aspect of the method for visually summarizing a video, the method may further comprise searching through the one or more slides by the user.

In another aspect of the method for visually summarizing a video, the method may further comprise receiving one or more markups from the user upon the one or more slides after presenting the one or more images as one or more slides.

In another aspect of the method for visually summarizing a video, receiving the one or more markups may comprise receiving one or more shapes or comments from the user upon the one or more slides.

In another aspect of the method for visually summarizing a video, presenting the one or more slides may comprise presenting the one or more slides which include the one or more markups and the timestamp to the user.

In another aspect of the method for visually summarizing a video, the method may further comprise categorizing the one or more images as a slide when the shape or text corresponds to the prior shape or text or categorizing the one or more images as a base image when the shape or text does not correspond to the prior shape or text.

In another aspect of the method for visually summarizing a video, the method may further comprise searching for keywords in the summary based upon an input from the user.

In another aspect of the method for visually summarizing a video, the method may further comprise searching for keywords in the transcript based upon an input from the user.

In another aspect of the method for visually summarizing a video, the method may further comprise searching for keywords in the comments from the user upon an input from the user.

In another aspect of the method for visually summarizing a video, the method may further comprise sharing the one or more slides with one or more additional users.

Another method of presenting a video notebook may generally comprise presenting one or more video summaries upon a display to a user as a corresponding thumbnail image, wherein each of the one or more video summaries provide one or more searchable keywords corresponding to a content of the video summary, and wherein creation of each of the one or more video summaries comprises: obtaining one or more images from a video as the video is played, locating a presence of a shape or text from each of the one or more images, determining whether the shape or text corresponds to a prior shape or text from a prior base image, determining whether each of the one or more images comprises a corresponding slide, presenting the one or more images as one or more slides upon an interface displayed to the user, providing a timestamp upon each of the one or more slides, whereby selection of the timestamp by the user plays the video at a location which correlates to the timestamp within the video, and presenting the one or more slides including the timestamp to the user.

In another aspect of the method for presenting a video notebook, obtaining the one or more images may comprise automatically obtaining the one or more images at a predetermined time interval.

In another aspect of the method for presenting a video notebook, obtaining the one or more images may comprise manually obtaining the one or more images when actuated by the user to create the corresponding slide.

In another aspect of the method for presenting a video notebook, obtaining the one or more images may comprise obtaining the one or more images from a dynamic information-rich visual image video comprising a plurality of images to create the corresponding slide.

In another aspect of the method for presenting a video notebook, obtaining the one or more images may comprise obtaining the one or more images from one or more build images to create the corresponding slide comprising a build sequence slide.

In another aspect of the method for presenting a video notebook, the method may further comprise obtaining auditory or textual information from the one or more images prior to presenting the one or more slides.

In another aspect of the method for presenting a video notebook, the method may further comprise generating a summary of the auditory or textual information.

In another aspect of the method for presenting a video notebook, the summary is generated as a transcript.

In another aspect of the method for presenting a video notebook, the method may further comprise automatically searching through the one or more slides by the user.

In another aspect of the method for presenting a video notebook, the method may further comprise receiving one or more markups from the user upon the one or more slides after presenting the one or more images as one or more slides.

In another aspect of the method for presenting a video notebook, receiving the one or more markups may comprise receiving one or more shapes or comments from the user upon the one or more slides.

In another aspect of the method for presenting a video notebook, presenting the one or more slides may comprise presenting the one or more slides which include the one or more markups and the timestamp to the user.

In another aspect of the method for presenting a video notebook, the method may further comprise categorizing the first image as a slide when the shape or text corresponds to the prior shape or text or categorizing the first image as a base image when the shape or text does not correspond to the prior shape or text.

In another aspect of the method for presenting a video notebook, the method may further comprise searching the keywords in a single video summary based upon an input from the user.

In another aspect of the method for presenting a video notebook, the method may further comprise searching the keywords in a plurality of the one or more video summaries based upon an input from the user.

In another aspect of the method for presenting a video notebook, the method may further comprise searching the keywords in the summary based upon an input from the user.

In another aspect of the method for presenting a video notebook, the method may further comprise searching the keywords in the transcript based upon an input from the user.

In another aspect of the method for presenting a video notebook, the method may further comprise searching the keywords in the comments from the user upon an input from the user.

In another aspect of the method for presenting a video notebook, the method may further comprise sharing the one or more video summaries with one or more additional users.

DETAILED DESCRIPTION OF THE INVENTION

Slide Identification and Capture

Viewers of videos-including online videos (e.g. Youtube videos), local videos and online meetings (e.g. Zoom meetings)—are presented with a series of images in a video frame on a computing device—e.g. a computer, a mobile phone, tablet etc. Sometimes, the video frame continuously updates with new images, once for every time the video "refreshes." This is motion video. Other times, though, part, or all, of the video frame maintains a static image for many seconds. The static image in the video frame usually has some text, but may also include some graphics, such as charts, photos, or graphical elements.

Figure 1:
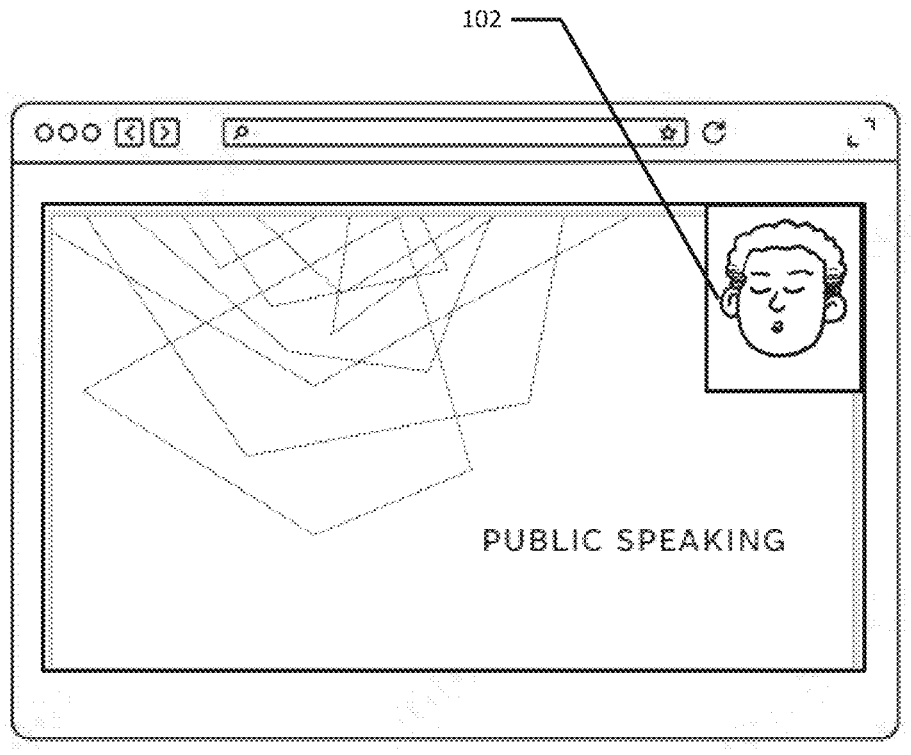
FIG. 1 shows an example of a slide as a screenshot from a video.

Such a static image in a video frame may be a "slide," as we shall define it. An example of a slide is shown as a screenshot from a video in FIG. 1. Such slides can be created by a presentation application like Microsoft PowerPoint or Google Slides or other applications. Note that, in FIG. 1, speaker 102 is in the upper right in a small video frame, and is moving (motion video). In other cases, the speaker may be standing in front of a video screen that contains a slide, while speaking about the slide. In other cases, the video frame may be filled by a slide—i.e. there is no speaker nor motion video in the video frame.

These slides may contain important information for viewers. In other words, these slides may contain a significant proportion of the information value of the entire video.

One aspect of the system is the notion of automatically identifying and capturing slides from videos (prerecorded or live, including videos and virtual meetings) automatically for future reference. The system may recognize a slide or slides with no prompting by the viewer, and save it. One implementation of the system recognizes slides using computer vision techniques built on top of OpenCV (https://github.com/opencv), an open source library.

In one implementation the system grabs a still image from the video periodically, every N milliseconds—for example, every 1000 milliseconds (one second). It attempts to identify one or more slides based on one or more criteria, for example, the system may perform one or more of the following:

Find a rectangular shape in the image.

Determine whether the rectangular shape represents a slide using:
  i. Size
  ii. Aspect ratio
  iii. Location in image
  iv. Whether this is the first or subsequent image with a similar rectangle.

(Optional) Identify text in the image and determine whether text represents a slide
  i. Text size
  ii. Amount of text The system may skip an image (i.e. not identify it as a base image for a potential slide) if the image has no rectangular shape that fits the above criteria.

Once the system has identified a base image (in some embodiments, this is an image with a rectangle conforming to certain criteria), it tries to find a rectangular shape in subsequent images that is substantially similar to the rectangular shape in the base image. The system may evaluate shape, text, content, color pallet, font, etc. in the next, previous, future or past image to determine if it is related. If the images conforms to a given similarity threshold, the system recognizes and categorizes such captured potential slides as a "slide." In some instances, shapes other than rectangles may be recognized in images, such as circles, parallelograms, etc., in determining whether an image is a base image or a slide.

Identification and Capture of Slide Markups

The system may detect any markup performed by the presenter and save as a modified slide.

The system is able to determine which images are sufficiently dissimilar to each other in order to determine that an image is a new a slide. Moreover, the system can ignore a small region where movement is happening, such as a talking head in a corner. Or, in another example of an insignificant difference, a small part of the screen may be animated.

The system may capture multiple slides in a video. At the point where the system captures a slide, the system also captures video meta data such as the time stamp in the video at which the slide first appears and/or disappears. The system may also capture the text from the slide, such as printed text, and/or participant names, info and/or comments. The system may also, or alternatively, capture spoken text from an interval centered around the moment that slide appears—for example, from an interval that starts 15 seconds before the slide appears, and ends 15 seconds after the slide appears.

Captured slides may be shown in a list or grid as they are captured which can be reviewed while the automated capture is happening (on the same screen) and/or when reviewing the visual summary. A button next to each capture contains a timestamp which the user can click to move the video to the relevant point where the slide appeared, and may start playing the video at that point (the specific timestamp). If the slides are from a live event or live meeting, the button may take the user to the specific point in the video recording, provided the meeting was recorded.

The slide list area may also include fields for the user to add notes or for notes to be added from a collective chat.

The slide list area may also contain other content such as user-created notes-text notes and manually taken screenshots of the video frame. Each of these user-created notes contains a timestamp that allows the user to play the video from that point. The system may add other items to the slide list, such as speech-to-text captions from a transcript of speech during the video, or AI interpretation/summaries of the speech associated with a captured slide, and/or the text on the slide or user comments. The system may use AI to analyze these parameters for a certain timeframe surrounding a slide. For example, the AI may analyze the spoken words 10 seconds before a slide appears, and for the duration the slide is visible. This captures any set up comments made by the presenter, in addition to the statements made by the presenter while the slide is visible.

Collectively, we can call this list of captured slides, user-created text notes, transcript notes, AI notes and/or user-created screenshots a "notes list" or a "video summary." The notes list constitutes a summary of the video that can be more efficient to consume than watching the entire video. In addition, it can serve as an index interface to the original video, so that the user may use it to watch only a subset of the video associated with particular notes and/or slides. This list can be created entirely via computer—i.e. automatically, without any user intervention. Or it can be created with interaction by the user. The slide list may be created while the user is watching the video and/or meeting, or it may be created separately from viewing. For example, a video may be loaded into the system while a user is doing something else. Or, a server may generate a notes list with no involvement by the user at all. The system can produce the notes list that the user may review at his/her leisure. The notes list may be reviewed by the original user, or may be reviewed by any other user or users, in other words, it may be shared and/or exported.

Figure 2:
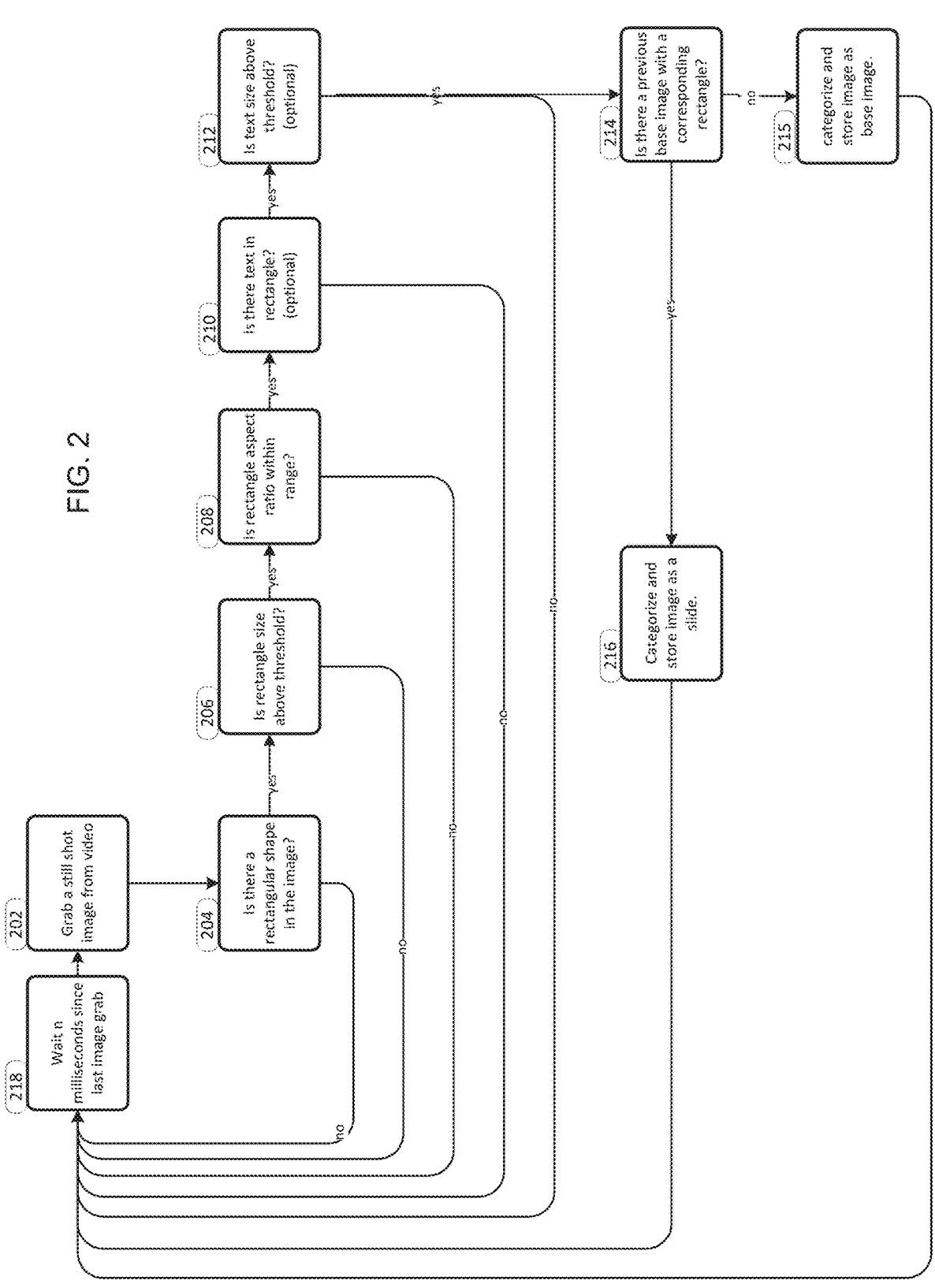
FIG. 2 shows a flow of how the system may identify/categorize and capture slides from images in a video.

FIG. 2 shows a flow of how the system may identify/categorize and capture base images and slides, from images in a video. Step 202 represents the systems grabbing of a still shot image from a video. This may occur periodically and automatically, or this may occur manually. This figure represents the system's grabbing images automatically every N milliseconds. After the current image is grabbed from the video, the system moves on to step 204 to evaluate whether there is a rectangular shape in the current image. A rectangle is generally represented by perpendicular lines, generally horizontal and vertical, which enclose a space in the current image. The corners may be sharply square or may be slightly rounded. Other factors may play into the recognition of a rectangle.

In step 204, if the answer is yes, that the system has determined that there is a rectangle in the current image, the system moves on to step 206. In step 206, the system checks to see whether the rectangle is above a designated size, width, and/or height. For example, the system may check to see if the rectangle width is at least 60% of the current image width. The system may check for absolute size (a dimension) and/or relative size (a percentage of the image size). In this step of this example, the system is checking relative width size, but the system may check other size parameters, such as area, circumference, height, ratios of width/height/area/circumference etc. The size threshold may be an absolute number, a percentage relating to the current image size, maybe be constant for all videos, or may be different for different videos.

If the system determines in step 206, in this example, that the rectangle size is within the designated parameters, the system moves on to step 208 to determine whether the aspect ratio of the rectangle is within range. For example, the system may define a width:height ratio range of about 16:9-4:3.

If the system determines in step 208, in this example, that the rectangle aspect ratio is within range, the system may move on to optional step 210 to determine whether there is text within the borders of the rectangle.

If the system determines in step 210, in this example, there is text within the rectangle, the system moves on to step 212 to determine whether the text size is above a defined threshold. For example, the defined threshold may be that the largest text within the rectangle is greater than about 7% of the rectangle height. Other thresholds may be used, such as absolute size of the text. Amount of text, capitalization of text, meaning of text, layout of text and other parameters may also be used to determine whether or not an image is to be categorized as a slide.

If the system has confirmed that a rectangle exists (step 204), that the rectangle is above the size threshold (step 206), that the rectangle is within a defined aspect ration range (step 208) and optionally that the image contains text (step 210) and optionally that the text size is above a threshold (step 212), then the system moves on to step 214.

In step 214, the system either registers a base image if there is none, or it compares the current image to the base image. In the former case, the current image becomes the base image for the next iteration of the algorithm—i.e. the system moves on to step 215 and categorizes the current image as the base image. In the latter case, the system determines whether the base image has a rectangle (and optionally text) that is similar to the rectangle in the current image. Similarity of rectangles is determined as follows. First, the rectangles are run through a comparison function, outputting a difference rectangle. Then, the difference rectangle is run through a de-noising function to drop small details. The result of this difference rectangle returns "similar" for the two rectangles if it is empty. Note that the system can ignore a small sub-rectangle of the same location and size inside both rectangles. For example, a talking head rectangle inside both the base image and current image may be ignored. The "smallness" of the small rectangle within (or next to) the larger rectangle may be determined by dimension, area, circumference etc. For example, the rectangle may be considered "small" if its area is less than 25% of the area of the larger rectangle. If the rectangle in the base image and that in the current image are deemed similar, the system moves on to step 216. The base image is a slide, and will be categorized as a slide if it hasn't already. The base image is used for the next iteration of the algorithm. If the rectangles aren't sufficiently similar, the base image is dropped for the next iteration of the algorithm, so that there is no base image.

Note that the steps described above and herein describe steps that can be taken to achieve particular goals. For example, the paragraph above describes steps that may be used to identify a slide. However, other steps may be used, including analyzing different features of images, different steps, additional steps, fewer steps, etc.

The system continues to capture still shots images from the video (represented by step 202) every N milliseconds (represented by step 218) and follows the same process to assess more still images to determine whether they are categorized and stored as slides.

In some embodiments, other features of the current image may be considered in categorizing it as a slide. For example, color, font, percentage of image which is filled, existence of text, meaning of text, existence of audio, meaning of audio, existence of a talking head, context with other still shot images etc.

Identification and Capture of Slide Build Sequences

The system may recognize images as stages of a slide's "build sequence". The term commonly used for the slides in a build sequence is a "build slide," but note that a build slide is actually composed of multiple images. The first slide in a build sequence usually shows a slide title, and, in some cases, a small amount of information underneath (or near) that. Each slide in the build sequence contains added information (text and/or graphics) in the empty space not previously occupied by any information. Or, in some instances, some of the information in one slide, usually below the title somewhere, is replaced by information in the next slide in the sequence. In any case, the last slide in a build sequence is usually considered the final, conclusive information of the entire build sequence. The system is able to recognize; individual images within a build sequence, as well as the final image in a build sequence, or the build slide.

The system recognizes build slides and as a result, can save each image in a build sequence, or it can save only the image of the last stage in a build sequence, in which case, it uses the last slide in the build sequence, and saves only that slide. In the latter case, it attaches the time of the first slide in the sequence to this last slide, so that the build slide is associated with the time of the first image in the build sequence. In other words, the system saves the image of the last slide in a build sequence as the build slide, but the time associated with the build slide is not the time the last slide is presented in the video, but is rather the time of the first image in the build sequence.

FIGS. 3A-G show examples of still shot images which may be considered by the system to identify build sequence slides.

Figures 3A, 3B, 3C, 3D, 3E, 3F, 3G:
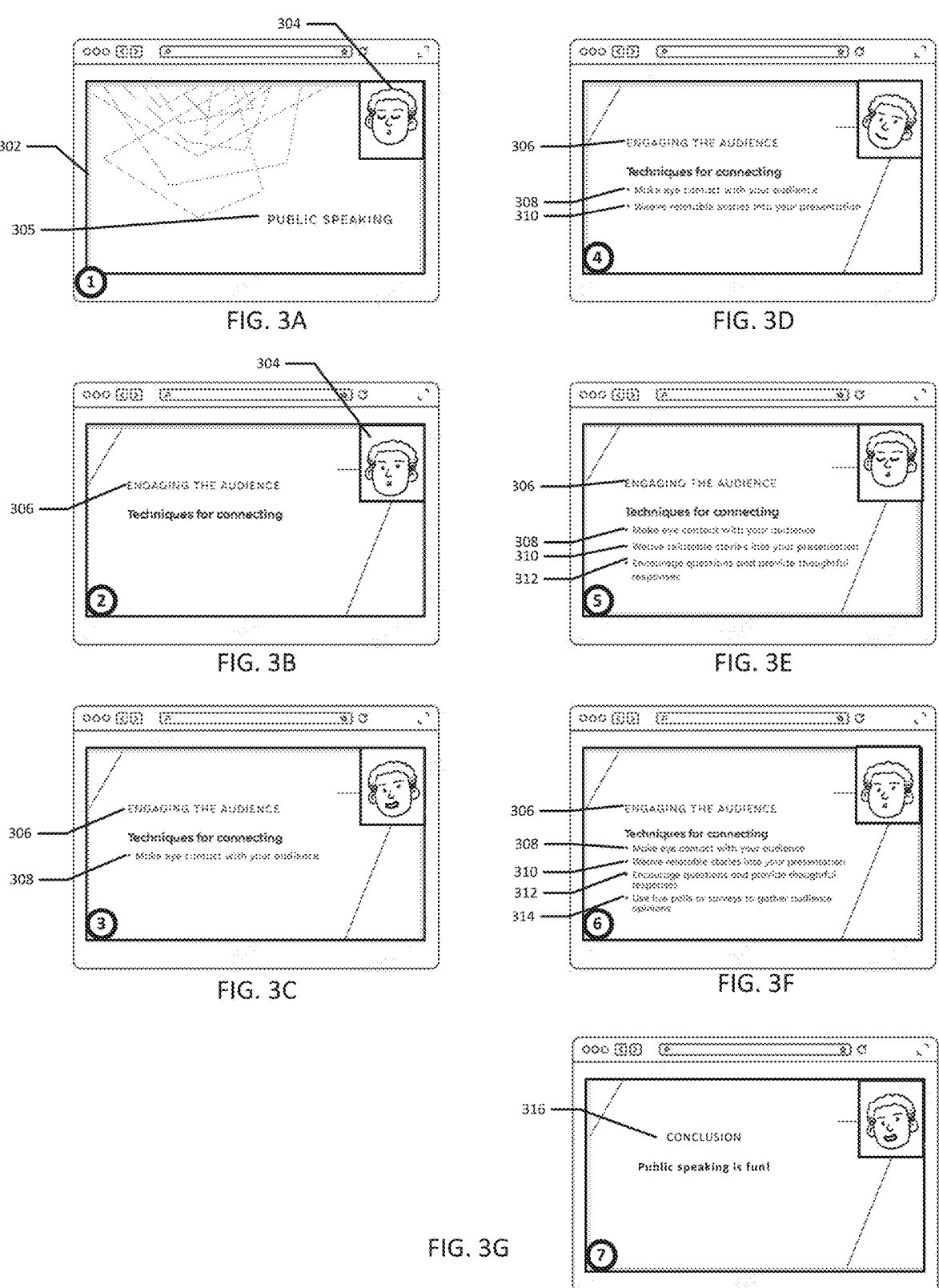
FIGS. 3A-G show examples of still shot images which may be considered by the system to identify build sequence slides.

FIG. 3A shows image 1 which has been categorized as a new slide. This slide includes rectangle 302 and talking head 304, as well as text 305.

FIG. 3B shows image 2 which has been categorized as a new slide. This slide shows talking head 304 as well as text 306 (which is different than text 305 in the slide in FIG. 3A).

FIG. 3C shows image 3 which includes the same text, 306, as the text in the slide in FIG. 3B, as well as additional text 308. This image is related to the slide in FIG. 3B, and is building on the slide in FIG. 3B. As a result, the system adds this image to a build sequence for the slide in FIG. 3B.

FIG. 3D shows image 4 which includes the same text, 306 and 308, as the text in the image in FIG. 3C, as well as additional text 310. This image is related to the slide in FIG. 3B, and is building on the image in FIG. 3C. As a result, the system adds this image to a build sequence for the slide in FIG. 3B.

FIG. 3E shows image 5 which includes the same text, 306, 308 and 310, as the text in the image in FIG. 3D, as well as additional text 312. This image is related to the slide in FIG. 3B, and is building on the image in FIG. 3D. As a result, the system adds this image to a build sequence for the slide in FIG. 3B.

FIG. 3F shows image 6 which includes the same text, 306, 308, 310 and 312, as the text in the image in FIG. 3E, as well as additional text 314. This image is related to the slide in FIG. 3B, and is building on the image in FIG. 3E. As a result, the system adds this image to a build sequence for the slide in FIG. 3B.

FIG. 3G shows image 7 which includes new text 316, which is different than the text in the previous images. As a result, the system categorizes this image as a new slide and combines the images of FIGS. 3B-3F into a build sequence slide, which is represented by the last image in the sequence, or the image in FIG. 3F. The timestamp associated with the build slide in FIG. 3F is the timestamp collected with the slide in FIG. 3B, or the first image in the build sequence. To summarize, there are three slides represented in FIGS. 3A-G:

Slide 1—Image 1 (as shown in FIG. 3A) with timestamp associated with this image.

Slide 2—Image 6 (as shown in FIG. 3F). This is a build slide with timestamp associated with image 2 in FIG. 3B.

Slide 3—Image 7 (as shown in FIG. 3G) with timestamp associated with this image.

Note that the talking head is changing and moving among these images. In this example, the system ignores these changes in developing the build sequence since they are irrelevant to the content of the slides. In some embodiments, the system may incorporate additional information into the development of the build sequence. For example, the system may analyze the speaker's audio, or analyze the reader's lip movement for key words, such as "next slide." The system may also incorporate information from the speaker's expressions.

Figure 4:
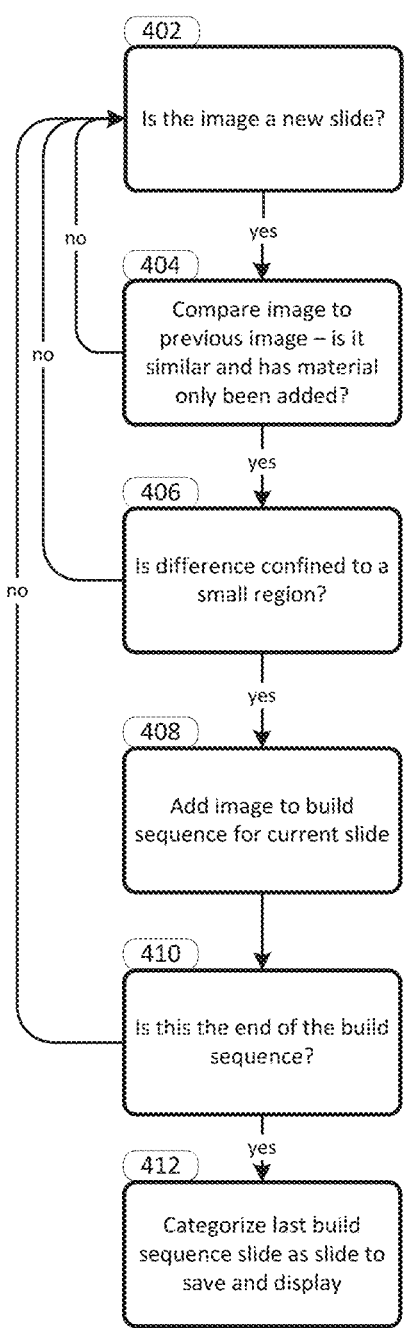
FIG. 4 shows a flowchart of the system's function in categorizing and building a build sequence slide.

FIG. 4 shows a flowchart of the system's function in categorizing and building a build sequence slide. First, the system should have recognized and saved a slide as shown in step 402. This step is also represented in FIG. 2. Once it does this, it examines the next image to determine whether it is a build image that adds to this slide, or not. This is shown in step 404. If a substantial region of the next image is identical to the same region of the slide, but adds information (type or graphics) in another region of the image, it becomes a build image, and a build sequence of images is established. This is shown in step 408. If the image does not share a substantial portion of the slide, no build sequence is created.

The system may evaluate whether the difference between the new image and the slide is confined to a small rectangle within (or next to) the larger rectangle, which may indicate the difference is simply a talking head moving. This is shown in step 406. The "smallness" of the small rectangle within (or next to) the larger rectangle may be determined by dimension, area, circumference etc. For example, the rectangle may be considered "small" if its area is less than 25% of the area of the larger rectangle.

If the difference is confined to a small rectangle within (or next to) the larger rectangle, the system moves on to step 408 and adds the image to the build sequence of the current slide.

The system then moves on to step 410 to determine whether the image is the end of the build sequence. If the image is not the end of the build sequence, the system continues to cycle through the process and add images to the build sequence, similar to what is shown in FIGS. 3B-3F. If the system determines that the next image is not part of the build sequence, the system moves on to step 412 and designates the last image in the build sequence as the build sequence slide. For example, this is shown in FIG. 3F. the build sequence slide is allotted the time stamp of the FIRST image in the sequence. This is so that the user can click a link associated with the final build slide, and be brought back to the point in the video where the build sequence begins. The final build slide represents the culmination of the information presented throughout the build sequence.

Dynamic Information-Rich Visual Image (DIVI) Identification and Capture

DIVI stands for Dynamic Information-rich Visual Image. In other words, DIVIs are information-based images in a video that, unlike slides, change almost constantly as the video progresses, and in less predictable ways.

The slide capture process mentioned above handles dynamic images by doing at least the following:

ignoring talking heads on or around a slide ignoring small areas of dynamic content on a slide recognizing stages of a DIVI build DIVI capture saves a series of images from a video that are not categorized as "slides." These images are neither separate slides, nor are they stages, or steps, of a build slide, because they are generally more different from each other than are build slides. In addition, the change from one slide to the next may not merely add content, but it might subtract content as well, or move content. The following are examples of segments in a video or meeting that will result in a series of DIVI images:

whiteboard sessions online demos coding sessions animated presentations

DIVI capture is part of the same system defined in Slide Identification and Capture above, so, in both cases an image from a video is evaluated every N milliseconds. This image will be considered as a possible slide or DIVI image if it contains a rectangle of sufficient size and aspect ratio, and it also may be required to have at least one string of text characters. We will call an image that passes these tests a "base image."

The process of creating a DIVI build, including progressive DIVI images, can be summarized as follows:

If the system has identified a base image for a slide, and if the current image has a rectangle that satisfies the rectangle requirements (aspect ratio, size, etc.), but that rectangle is not sufficiently similar to the base image, then the base image is rejected as a slide in the algorithm described in FIG. 2. If the image is not classified as a slide, then the system analyzes the image for text to determine if the image is a DIVI image. If the base image has a string of text of length M characters or more, that base image is recognized and saved as a DIVI image. For example, the system may identify a DIVI image if the string of text has at least 1 character. Alternatively, the system may identify a DIVI image if the string of text has at least 2 characters. Alternatively, the system may identify a DIVI image if the string of text has at least 3 characters. Alternatively, the system may identify a DIVI image if the string of text has at least 4 characters. Alternatively, the system may identify a DIVI image if the string of text has at least 5 characters. Alternatively, the system may identify a DIVI image if the string of text has at least 6 characters. After that, subsequent images (new "current images") are evaluated as possible DIVI images in a DIVI loop as follows:

The system considers three levels of similarity between the base image and the current image. The levels include level 1, level 2 and level 3, where level 1 images are very similar, level 2 images are somewhat similar, and level 3 images are not similar. Level 1 and 2 are separated by threshold A. Level 2 and 3 are separated by threshold B. The current image's text similarity to the base image will determine how the image is categorized. More detail on this is discussed below.

If the similarity is at or below threshold A (the two images are very similar, i.e. in level 1), the system will not classify the current image as a new DIVI image, and will repeat the DIVI loop, moving N milliseconds ahead, comparing the new current image to the base image.

If the similarity is between threshold A and threshold B (the images are somewhat similar, i.e. at level 2), the system will recognize the current image as a DIVI image and save it. The current image becomes the base image and the DIVI loop is repeated.

If the similarity is above threshold B (the images are very different, i.e. in level 3), the system will not add the current image as a DIVI image, and will exit the current DIVI loop. The next image is evaluated as a possible base image.

This process for evaluating a DIVI image is similar to that of building a build slide, however in building a build slide, the system is primarily looking for added region(s). In evaluating a DIVI image, the system is looking for similar text. Also the evaluation of text in a DIVI image may require OCR. In both the build slide and the DIVI image, text may be the primary attribute analyzed (the addition or similarities of text), however, in some embodiments, images, audio, context or other attributes may be considered in creating build slides and/or DIVI images.

For example, the audio may be analyzed for transition words, or pauses, or expressions, to indicate the addition of material to a DIVI sequence. For example, a presenter may say "in addition", to indicate he/she is about to add another piece of information, or the presenter may say "in conclusion" to indicate the DIVI sequence is nearing the end.

Figure 5A:
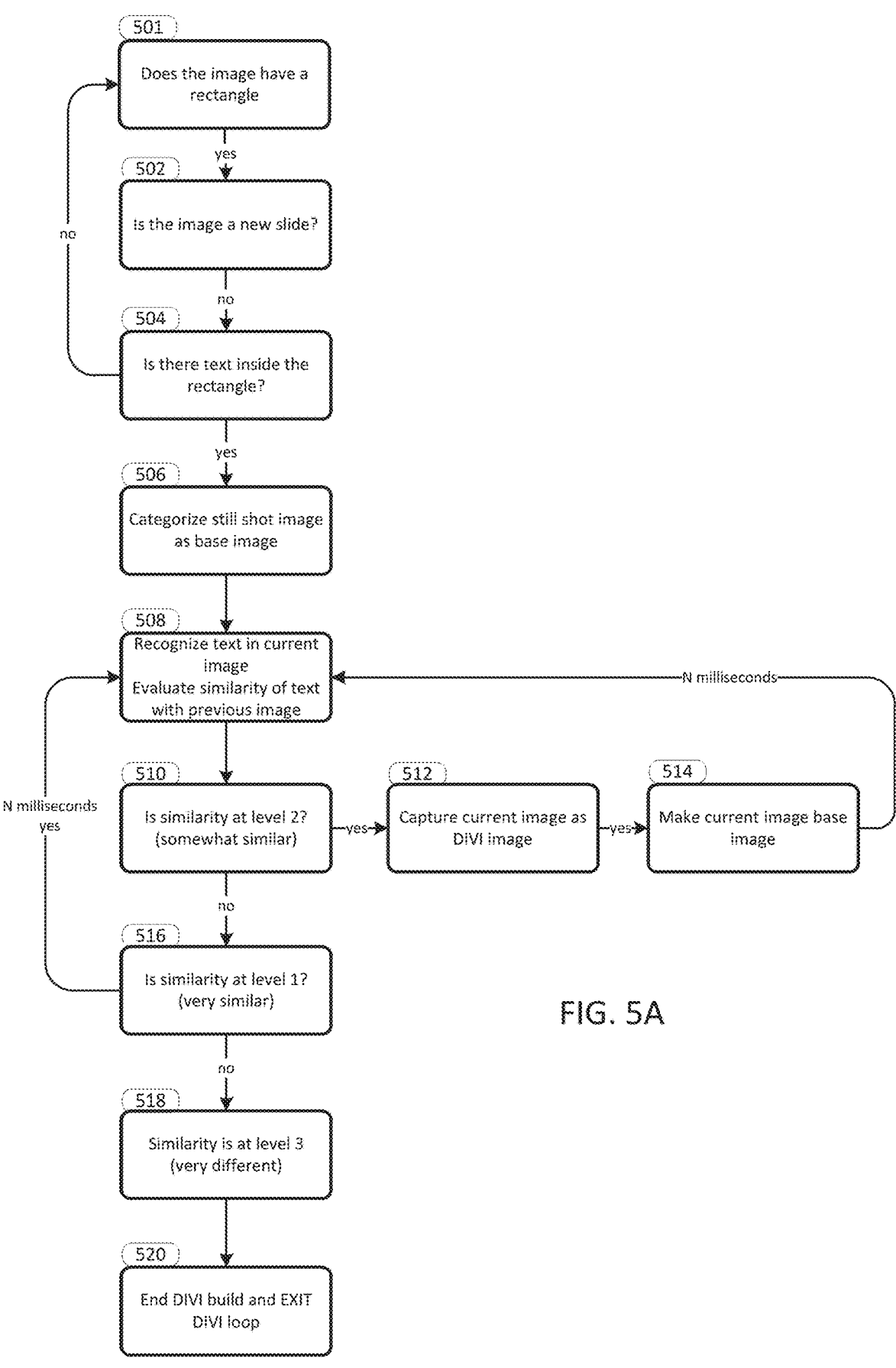
FIG. 5A shows a flowchart of an example of the system logic for building a DIVI build.

FIG. 5A shows a flowchart of the system's logic for building a DIVI build. In step 501, the system evaluates whether an image has a rectangle (including evaluating potential rectangle parameters, such as size, width, length etc., as disclosed herein). If the image does include an acceptable rectangle, the system moves on to step 502. In step 502, the system evaluates whether an image is a new slide. This step is represented in FIG. 2. If the image is a slide, then the system exits the DIVI loop and continues with the appropriate slide algorithm. If the image is not a slide, the system moves on to step 504.

In step 504, the system determines whether there is text within the rectangle of the slide. This step may include OCR-ing the image to determine whether there is text. This step may also include defining text as text within a certain size range, or the amount of text that is required to reach a threshold of detecting text. If adequate text is determined to be within the rectangle of the image, the system moves on to step 506. If there is no text, or inadequate text, within the rectangle of the image, the system returns to step 501, which may include a wait of N milliseconds.

In step 506, the system categorizes (and may store) the image as the base image, on which a DIVI sequence may be built.

In step 508, the system evaluates the text in the current image and determines how similar the text is to the previous image, the base image. If the similarities are within level 2 (step 510) (somewhat similar), then the system captures the current image and categorizes it as a DIVI image and adds it to the current DIVI sequence (step 512). The system then makes the current image the new base image (step 514) and returns to step 508 where it will analyze the next image (after waiting N milliseconds) and compare it to the base image.

If the similarities at step 508 are not at level 2, and they are at level 1 (step 516) (very similar), the system returns to step 508 where it will analyze the next image (after waiting N milliseconds) and compare it to the base image.

If the similarities at step 508 are not at level 2, and they are at level 3 (step 518) (very different), the system exits the DIVI loop.

Figure 5B:
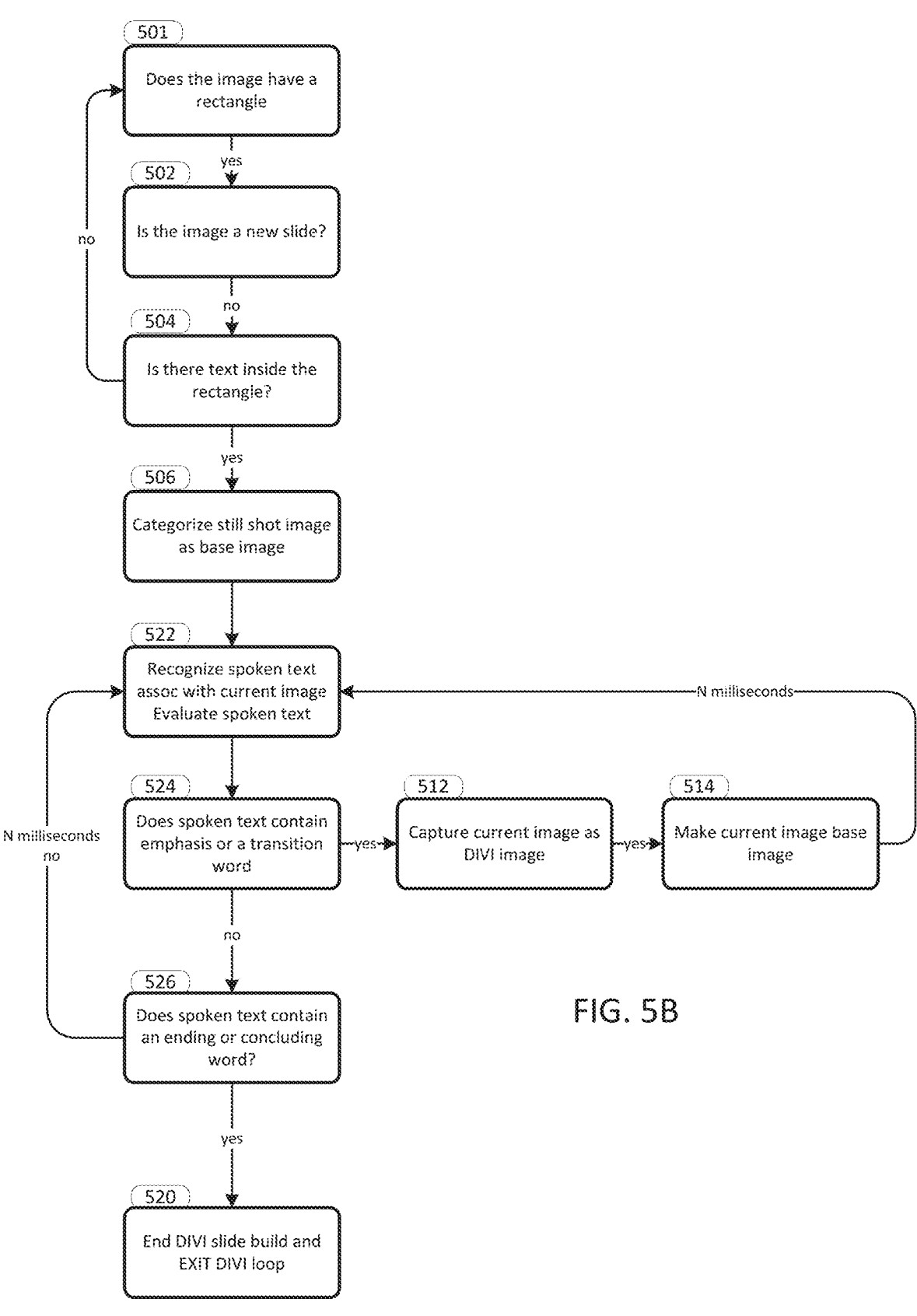
FIG. 5B shows a flowchart of another example of the system logic for building a DIVI build.

FIG. 5B shows a flowchart of the system logic for building a DIVI build which is similar to that shown in FIG. 5A, however in this example, the system uses spoken language instead of written text to determine whether or not an image is included in a DIVI build. Either written text or spoken text, or both, and/or other factors may be used to create DIVI builds or build slides.

In step 501, the system evaluates whether an image has a rectangle (including potential rectangle parameters, such as size, width, length etc., as disclosed herein). If the image does include an acceptable rectangle, the system moves on to step 502. In step 502, the system evaluates whether the current image is sufficiently similar to the base image to make the base image a slide. This step is represented in FIG. 2. If the current image is a slide, then the system exits the DIVI loop and continues with the appropriate slide algorithm. If the image is not a slide, the system moves on to step 504. In step 504, the system determines whether there is text within the rectangle of the slide. In this embodiment this is an optional step. This step may include OCR-ing the image to determine whether there is text. This step may also include defining text as text within a certain size range, or the amount of text that is required to reach a threshold of detecting text. If adequate text is determined to be within the rectangle of the image, the system moves on to step 506. If there is no text, or inadequate text, within the rectangle of the image, the system returns to step 502, which may include a wait of N milliseconds.

In step 522, the system evaluates the spoken text associated with the current image. If the spoken text contains a particular emphasis or a transition word (step 524), the system captures the current image and categorizes it as a DIVI image and adds it to the current DIVI build (step 512). The system then makes the current image the new base image (step 514) and returns to step 508 where it will analyze the next image (after waiting N milliseconds) and compare it to the base image.

In some embodiments, other factors may be incorporated into the spoken text analysis. For example, presenter tone, volume, pauses. In some embodiments, the facial expression, movement, position, etc. of the presenter may be taken into account in the spoken text and/or image analysis.

If the text analyzed at step 524 does not contain a particular emphasis or transition word indicating it is a DIVI image, the system moves on to step 526 to determine if the spoken text includes a concluding word. If the spoken text does include a concluding word, the system moves to step 520 and ends the DIVI build and exits the DIVI loop.

If the spoken text analyzed at step 526 does not include a concluding word, the system returns to step 522 where it will analyze the spoken text associated with the next image (after waiting N milliseconds) and compare it to that of the base image.

Note that FIGS. 5A and 5B use different parameters to build a DIVI sequence (written text vs. spoken text), however, the system may use either, both and/or other parameters to develop a DIVI sequence.

Figure 6:
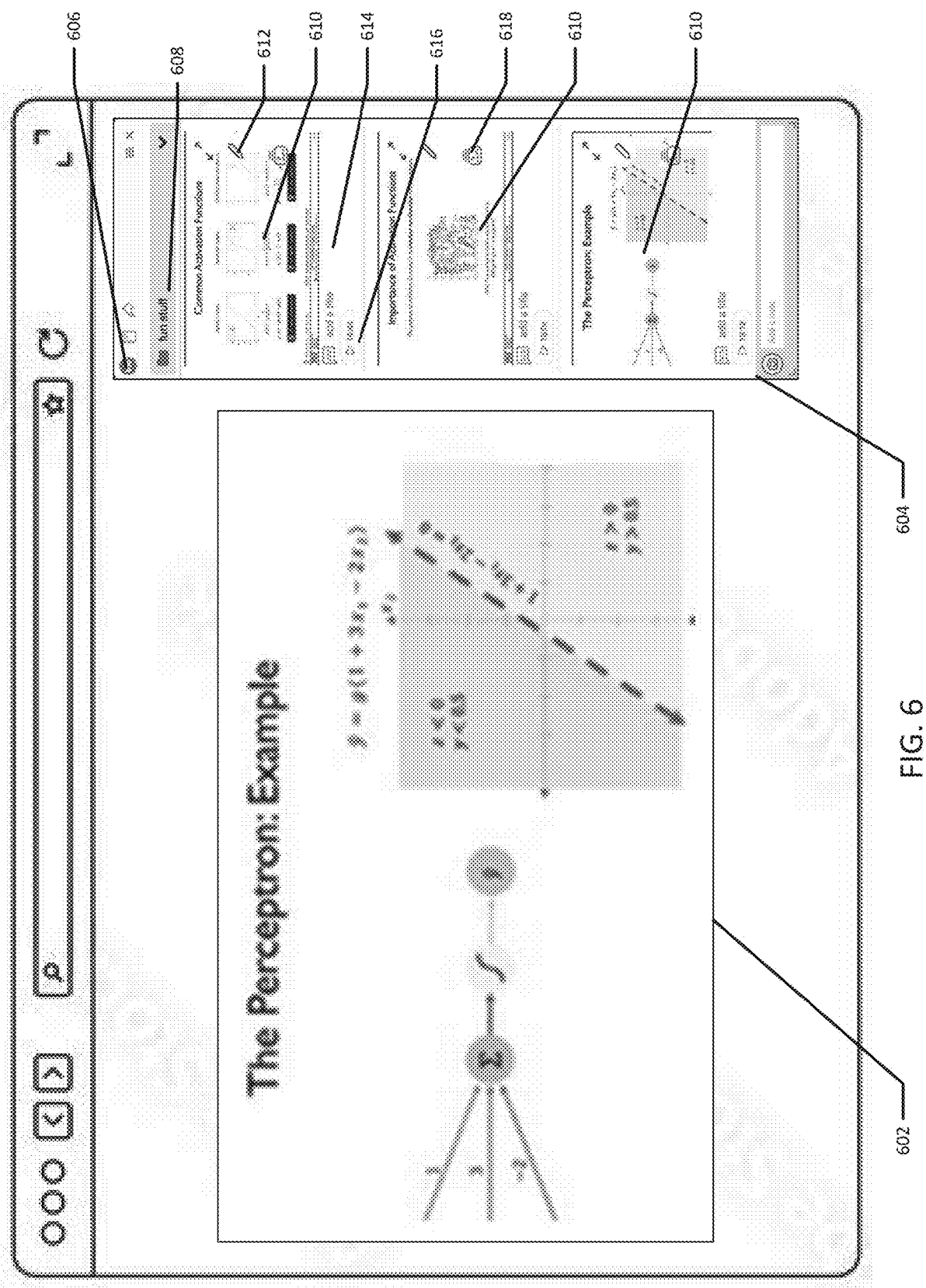
FIG. 6 shows an example of a video on the left, and system interface on the right, including information relating to the video.

FIG. 6 shows an example of a video on the left, and the system interface on the right, including information relating to the video. A video is shown here, but these concepts may also apply to a virtual meeting. Video section 602 of the interface shows the video as it is playing. System interface section 604 shows information that is captured and collected relating to video shown in section 602. Interface 604 shows up on the screen when a user engages the visual video summarization system. System indicator 606 is visible when the system has been engaged, to show the user that the system is analyzing the video for slides, DIVIs and other content.

Pulldown selection area 608 allows the viewer to select a notebook for filing this video summary. More on this will be discussed below. Within the system interface 604, one can see that slides 610 have been captured and stored. These slides may be captured via any of the systems disclosed herein, including automatic capture, as well as manual capture by the viewer. These slides may be regular slides, build slides, DIVI builds or other types of slides/builds.

Also shown within system interface 604 is markup icon 612. This allows the viewer to add markups to any of the slides, including highlighting, writing, circling, creating a line or other shape, etc. The viewer is also able to add comments in comment section 614. In some instances, the system will automatically add comments based on the written and/or audio text of the video. In some instances, the system may use AI to summarize the written and/or audio text of the video.

Also shown within system interface 604 is timestamp 616, as well as a play icon next to the timestamp. This timestamp is associated with the adjacent slide. If the viewer clicks on the icon next to the timestamp, the video will go to that point and start playing from that point—the point associated with the captured slide.

Icon 618 indicates that the associated slide has been automatically captured by the system vs. manually captured by the user. Manually captured slides may have all the same options indicated in this figure. In addition, slides shown within system interface 604 may be build slides and/or DIVI builds.

Figure 7:
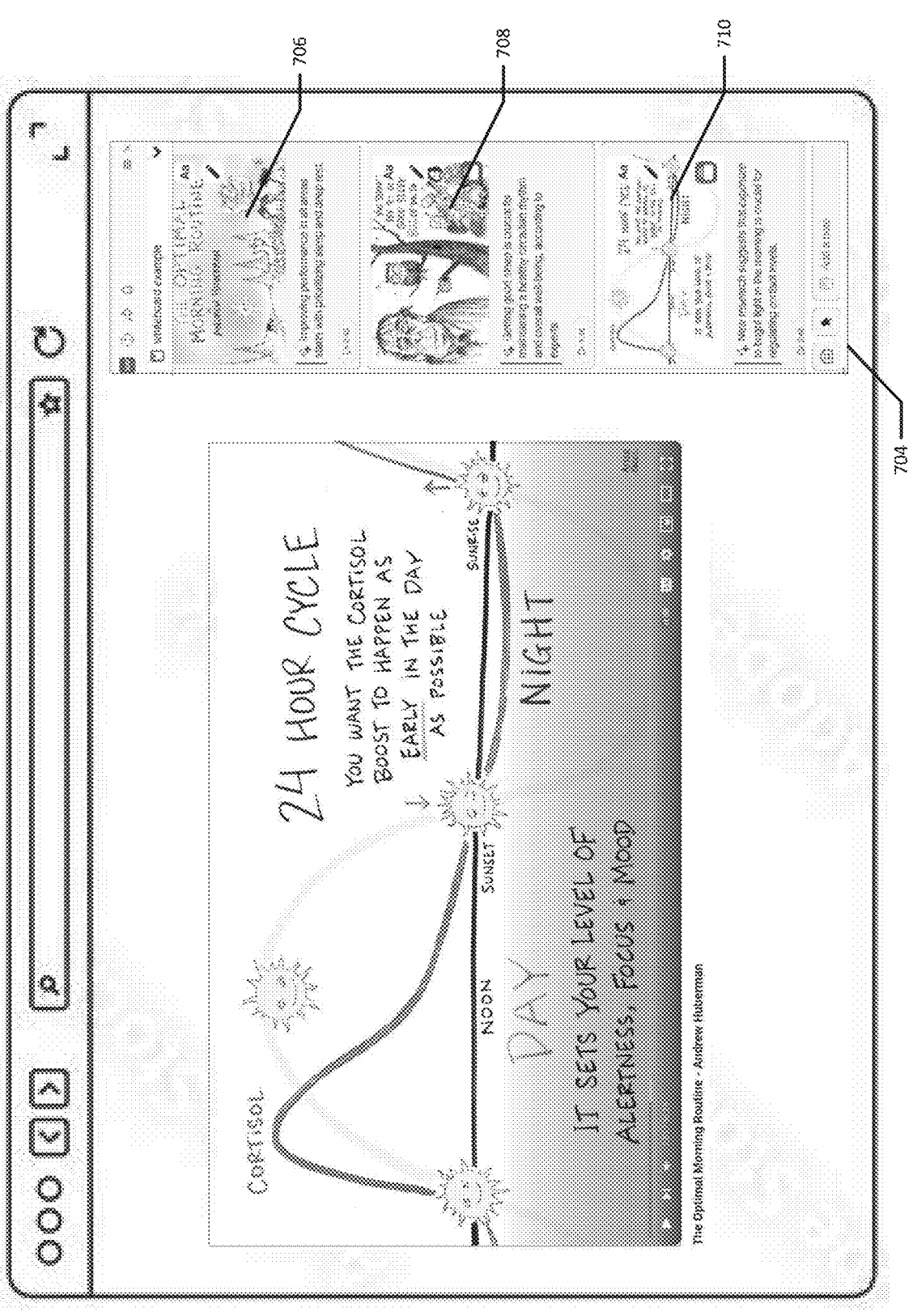
FIG. 7 shows an example of a DIVI build of several whiteboard sessions.

FIG. 7 shows an example of a DIVI build during a whiteboard session. Note that the text within the image is handwritten and the images also contain other components, such as graphs, images, colors, etc. The system analyzes the image every N milliseconds to determine the difference between the current image and the base image. This may be performed based on OCR-ed text and/or other factors. When the system determines that the current image is very different from the base image, the system ends the DIVI build and moves on to the next image analysis, which may be another DIVI build, or may be a slide etc. Shown in system interface area 704 are slides representing 3 different DIVI builds, 706, 708 and 710.

Storing and Organizing Video Summaries

Video summaries may be stored and organized in video notebooks. For example, a user may have created different video notebooks labelled: "work stuff," "fun stuff," "home design," etc. A summary for a video (including any captured slides, markups, notes, DIVI builds, slide builds, the original video or meeting recording, or a link to the original video or meeting recording, etc.) may be stored in the appropriate notebook. The notebooks may be available within a user's account via a browser interface on the internet, or locally on a user's computer.

Figure 8:
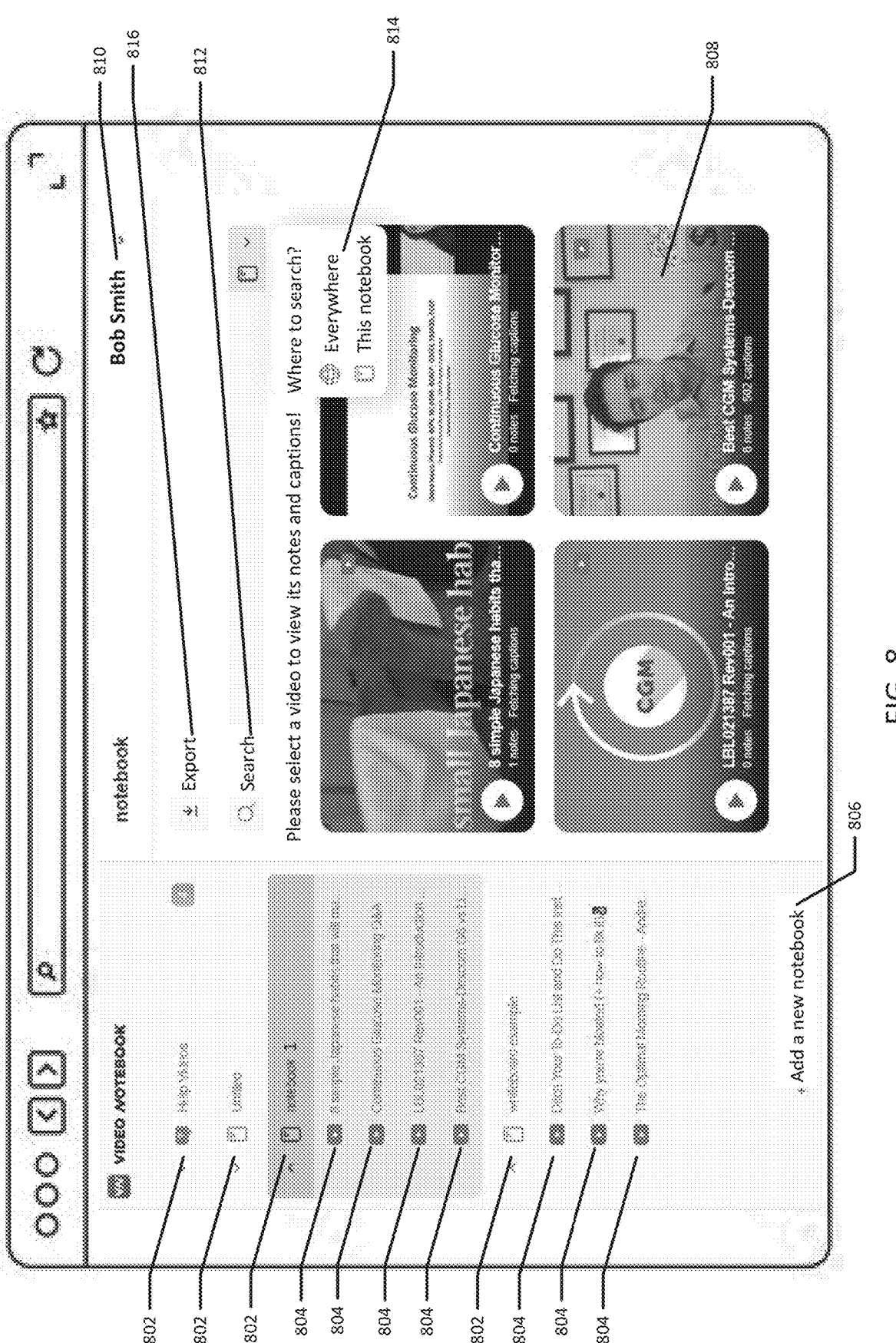
FIG. 8 is an example of the video notebook interface.

FIG. 8 is an example of the video notebook interface. Shown here is a list of the user's saved notebooks 802, as well as a list of the saved video summaries 804 within each notebook. New notebook link 806 allows the user to add notebooks. When a user selects a notebook 802 in the left column, a list of videos, along with thumbnail images representing each video, shown up in video thumbnail section 808. The name on the account is shown at 810.

Searching Video Summaries

Video summaries may be search, either within a notebook, or across notebooks (see option 814), or within selected notebooks, by entering a search term in search field 812. The search may search the video summaries using any of the following: written text in slides, written comments, audio text, audio text summaries (either transcription or AI summaries), images, concepts, presenter, participant identities, participant comments, participant expressions, participant reactions, slide "importance," type of slide, etc.

Sharing Video Summaries

The system may allow the sharing of the notes to other participants or any other recipient. This allows, for example, instructors to share a summary of a class, or students to share their collective notes, or meeting participants to share a concise summary of a presentation.

Video summaries and/or video notebooks may be shared by exporting, for example using export button 816. Alternatively, a user may send a person a share link, which gives the person with whom the link is shared access to one or more video summaries, one or more notebooks and/or access to a subset of video notebooks or a video summary. For example, a user may share a particular slide of a video summary, including the portion of the video to which the slide applies.

Key Slides/Chapters Identification and Capture

In some embodiments, the captured slides can be stored in "chapters" as a differential sequence with a base reference image and the visual progression which can be customized to the level of granularity by the user, with the extremes being a single image or the entire video sequence. Such technology may be also used to capture "white board" sessions which will display the chronological progression of the information.

The system may automatically, or the user, manually, select one slide representing the selection. This selection may include visual notation and/or multiple sub objects such as multiple slides, voice over, comments, reactions, facial expressions etc.

Participant Identification and Capture

This feature only applies more specifically to meetings than videos. Information about the participants of an online meeting is extremely important to meeting participants.

This system may record the name and thumbnail image of each meeting participant for each meeting, along with other metadata such as date and time. In some embodiments, the system obtains the name and image via the API of the meeting application (e.g. Zoom or Google Meet). Alternatively, this information may be obtained by "scraping" the images and text from the meeting screen.

To scrape, the system locates the names and thumbnails in the window, and then capture these as images and/or text. The system may use a computer vision library like OpenCV to locate thumbnail video frames, representing faces, with names underneath or near them. The image of the name may be processed by an OCR system to identify the characters of the name. The system stores the name and thumbnail image, associated with each other, in a database.

The system may additionally perform a search in private (such as a contact list) and/or public (such as LinkedIn, or an internet search engine) databases using the participant names and/or AI based facial recognition to add information to the participant data such as title, company affiliation, phone number and/or email address.

The system may interpret based on facial similarities whether a person in two images is the same person so that it will only store a single thumbnail image of a participant. The system may have the ability to recognize users already in its database so that participant information, including participant images, is only stored once in one record. This may be done across multiple meetings.

By storing these names and thumbnail images, the system can display names and thumbnails of all participants for any past meeting, giving a user a feeling of actually seeing all participants, even if an image of the participant was not available for that particular meeting. The system can also retrieve additional information about anybody in the database, such as LinkedIn information. The system can merge these data about meeting participants and meetings into another database, such as a CRM system.

Participants may also opt in or out of being recorded as part of any session. The system may have a built-in ability to "gray out" such participants that may not wish to be recorded while leaving others visible.

Participant Response Identification and Capture

The solution may record and/or analyze automatically other ancillary information either visually and/or contextually.

The system may analyze facial expressions of the participants and correlate the expressions to the temporal location in the session, thus creating a visual response to the slides and or content.

The system may record the attentiveness by analyzing eye tracking and or eye movement of the participants.

Interactions such as emojis, hand gestures, or other reactions may automatically be cataloged. The system may automatically create a screen capture when such reaction occurs.

The system may analyze these reactions to assess a level of interest at different temporal points in the meeting.

Similarly, all comments may be recorded and linked with the temporal location of the meeting, and the associated image may be captured concurrently with the time of the reaction. These images and comments may also be analyzed for level of interest or other factors.

Participant Comments Summarization

The system may allow for individual screen capture and/or comments by users or a collective capture by all/multiple/selected participants. This information may include notes or comments that the participants make manually to the presentation and/or the identity of the note taker.

In such collaborative session, an importance may be determined for each captured element. For example, if several participants capture an event, or screen, within a similar time frame, the system may apply a higher importance score to this event. The time frame for multiple participants capturing a single or similar event may be based on absolute time (for example, number of seconds), and/or may be based on what is on the screen. For example, a single slide may be on the screen for one minute, in which case, screen captures during that minute would all relate to that single slide. Audio may also be included in the analysis.

In some embodiments, the participants, or end users, may be able to filter slides by importance or by the participant who flagged the slide. For example, a user may be able to filter as follows: "show me only the slides that are of high importance", "show me only the slides that are flagged by the presenter", "Show me only the slides that were marked by presenter and viewer" etc.)

In case of a pre-recorded session (such as an online course), such collection of viewer selection may be across multiple sessions.

Participants may also opt in or out from such collective gathering of data, or select to participate anonymously.

Figure 9:
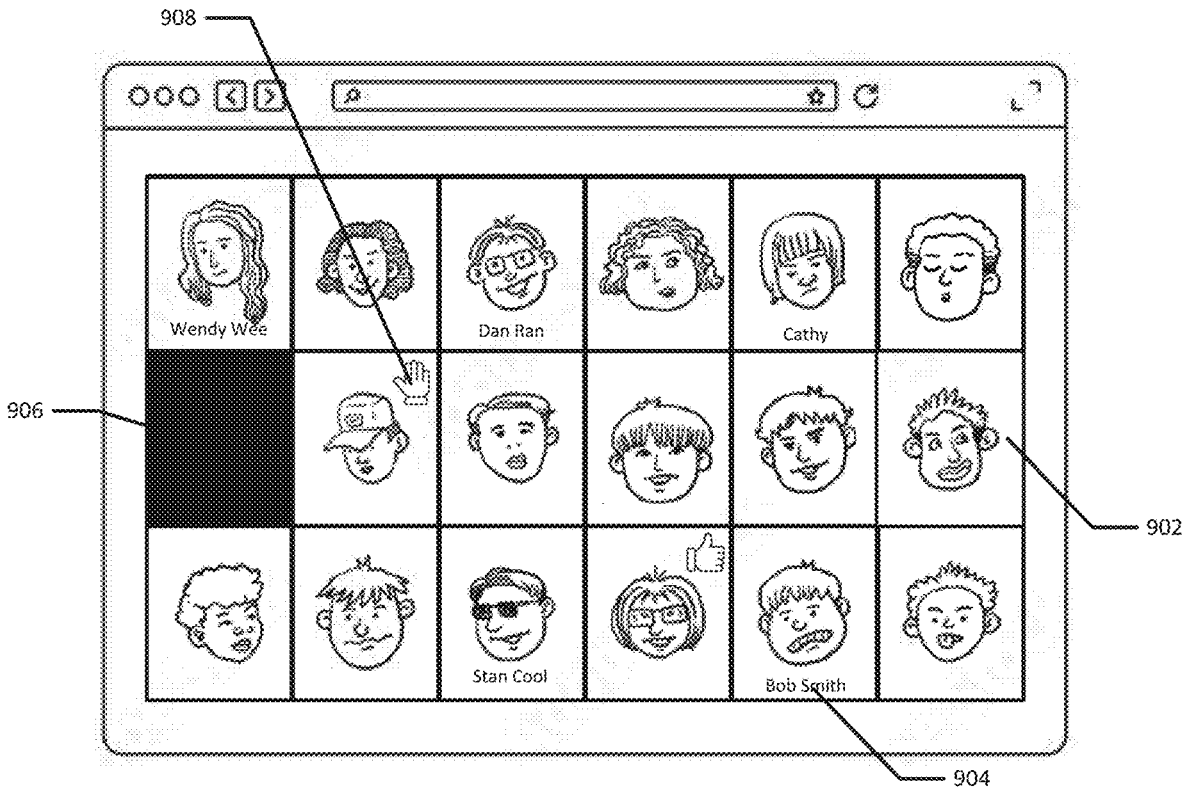
FIG. 9 shows an example of a virtual meeting.

FIG. 9 shows an example of a virtual meeting. This screen does not show an accompanying video or slides, but slides and/or a video may be included in the screen. Shown here are several different participants 902. Some of the participants may have their names 904 displayed on the screen. This allows the system to "scrape" the names from the screen and associate the names with thumbnail images of the participants' faces. In some instances, the system may use the participant faces and attempt to use facial recognition with other applications, such as LinkedIn, or a database of faces, to identify the participants.

Some participants may opt out of this process and may be blocked as shown in rectangle 906. Gestures, such as raising hands 908, or other gestures and/or written comments may also be captured and associated with a participant and a point in time. Facial expressions and verbal comments may also be captured and analyzed and associated with a point in time for system analysis.

Connecting to Other Productivity Tools

The information gathered by the system may be integrated with APIs to other productivity tools such as but not limited to:

Note taking applications

Video applications (Panopto™, Kaltura™)

CRMs (e.g. SalesForce™, Zoho™)

Online educational tools (e.g. Canvass™, Black Board™)

This integration may be done automatically. For example, a summary may be created for a meeting with participants of a company XYZ. The summary may automatically be posted to the CRM entry for the company and or the employees of that company.

Example of Data Processing System

Figure 10:
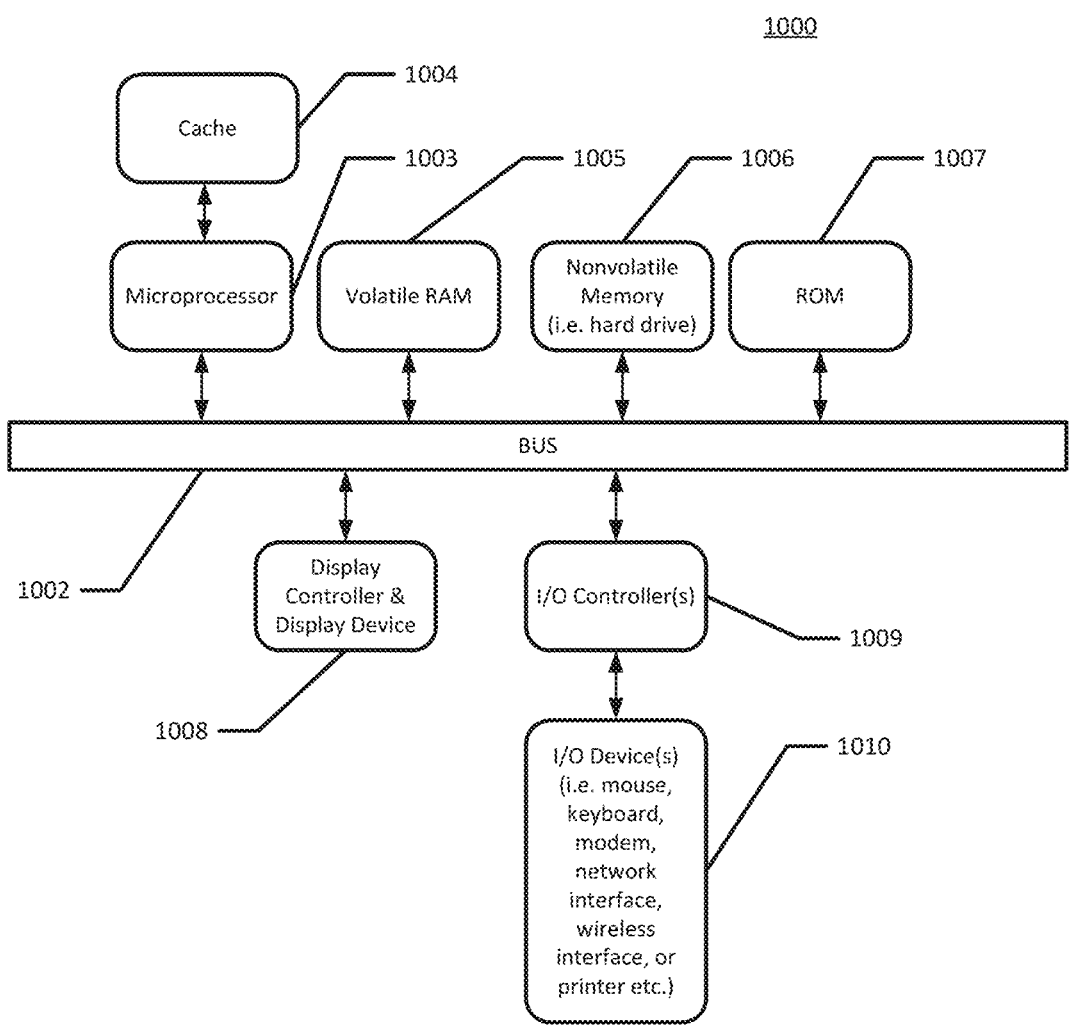
FIG. 10 is a block diagram of a data processing system, which may be used with any embodiments of the invention.

FIG. 10 is a block diagram of a data processing system, which may be used with any embodiment of the invention. For example, the system 1000 may be used as part of the processor. Note that while FIG. 10 illustrates various components of a computer system, it is not intended to represent any particular architecture or manner of interconnecting the components; as such details are not germane to the present invention. It will also be appreciated that network computers, handheld computers, mobile devices, tablets, cell phones and other data processing systems which have fewer components or perhaps more components may also be used with the present invention.

As shown in FIG. 10, the computer system 1000, which is a form of a data processing system, includes a bus or interconnect 1002 which is coupled to one or more microprocessors 1003 and a ROM 1007, a volatile RAM 1005, and a non-volatile memory 1006. The microprocessor 1003 is coupled to cache memory 1004. The bus 1002 interconnects these various components together and also interconnects these components 1003, 1007, 1005, and 1006 to a display controller and display device 1008, as well as to input/output (I/O) devices 1010, which may be mice, keyboards, modems, network interfaces, printers, and other devices which are well-known in the art.

Typically, the input/output devices 1010 are coupled to the system through input/output controllers 1009. The volatile RAM 1005 is typically implemented as dynamic RAM (DRAM) which requires power continuously in order to refresh or maintain the data in the memory. The non-volatile memory 1006 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1002 may include one or more buses connected to each other through various bridges, controllers, and/or adapters, as is well-known in the art. In one embodiment, the I/O controller 1009 includes a USB (Universal Serial Bus) adapter for controlling USB peripherals. Alternatively, I/O controller 1009 may include IEEE-1394 adapter, also known as Fire Wire adapter, for controlling Fire Wire devices, SPI (serial peripheral interface), I2C (inter-integrated circuit) or UART (universal asynchronous receiver/transmitter), or any other suitable technology. Wireless communication protocols may include Wi-Fi, Bluetooth, ZigBee, near-field, cellular and other protocols.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals-such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Any of the features of any of the embodiments disclosed herein may be used with other embodiments.

What is claimed is:

1. A method for visually summarizing a video, comprising:

obtaining one or more images from the video;

locating a presence of a shape or text from each of the one or more images;

determining whether the shape or text corresponds to a prior shape or text from a prior base image;

determining whether each of the one or more images comprises a corresponding slide;

presenting the one or more images as one or more slides upon an interface displayed to a user;

providing a timestamp upon each of the one or more slides, whereby selection of the timestamp by the user plays the video at a location which correlates to the timestamp within the video; and presenting the one or more slides including the timestamp to the user.

2. The method of claim 1 wherein obtaining the one or more images comprises automatically obtaining the one or more images at a predetermined time interval.

3. The method of claim 1 wherein obtaining the one or more images comprises manually obtaining the one or more images when actuated by the user to create the corresponding slide.

4. The method of claim 1 wherein obtaining the one or more images comprises obtaining the one or more images from a dynamic information-rich visual image video comprising a plurality of images to create the corresponding slide.

5. The method of claim 1 wherein obtaining the one or more images comprises obtaining the one or more images from one or more build images to create the corresponding slide comprising a build sequence slide.

6. The method of claim 1 further comprising obtaining auditory or textual information from the one or more images prior to presenting the one or more slides.

7. The method of claim 6 further comprising generating a summary of the auditory or textual information.

8. The method of claim 7 wherein the summary is generated as a transcript.

9. The method of claim 1 further comprising searching through the one or more slides by the user.

10. The method of claim 1 further comprising receiving one or more markups from the user upon the one or more slides after presenting the one or more images as one or more slides.

11. The method of claim 10 wherein receiving the one or more markups comprises receiving one or more shapes or comments from the user upon the one or more slides.

12. The method of claim 11 wherein presenting the one or more slides comprises presenting the one or more slides which include the one or more markups and the timestamp to the user.

13. The method of claim 1 further comprising categorizing the one or more images as a slide when the shape or text corresponds to the prior shape or text or categorizing the one or more images as a base image when the shape or text does not correspond to the prior shape or text.

14. The method of claim 7 further comprising searching for keywords in the summary based upon an input from the user.

15. The method of claim 8 further comprising searching for keywords in the transcript based upon an input from the user.

16. The method of claim 11 further comprising searching for keywords in the comments from the user upon an input from the user.

17. The method of claim 1 further comprising sharing the one or more slides with one or more additional users.

18. A method of presenting a video notebook, comprising:

presenting one or more video summaries upon a display to a user as a corresponding thumbnail image, wherein each of the one or more video summaries provide one or more searchable keywords corresponding to a content of the video summary, and wherein creation of each of the one or more video summaries comprises:

obtaining one or more images from a video;

locating a presence of a shape or text from each of the one or more images;

determining whether the shape or text corresponds to a prior shape or text from a prior base image;

determining whether each of the one or more images comprises a corresponding slide;

presenting the one or more images as one or more slides upon an interface displayed to the user;

providing a timestamp upon each of the one or more slides, whereby selection of the timestamp by the user plays the video at a location which correlates to the timestamp within the video; and presenting the one or more slides including the timestamp to the user.

19. The method of claim 18 wherein obtaining the one or more images comprises automatically obtaining the one or more images at a predetermined time interval.

20. The method of claim 18 wherein obtaining the one or more images comprises manually obtaining the one or more images when actuated by the user to create the corresponding slide.

21. The method of claim 18 wherein obtaining the one or more images comprises obtaining the one or more images from a dynamic information-rich visual image video comprising a plurality of images to create the corresponding slide.

22. The method of claim 18 wherein obtaining the one or more images comprises obtaining the one or more images from one or more build images to create the corresponding slide comprising a build sequence slide.

23. The method of claim 18 further comprising obtaining auditory or textual information from the one or more images prior to presenting the one or more slides.

24. The method of claim 23 further comprising generating a summary of the auditory or textual information.

25. The method of claim 24 wherein the summary is generated as a transcript.

26. The method of claim 18 further comprising automatically searching through the one or more slides by the user.

27. The method of claim 18 further comprising receiving one or more markups from the user upon the one or more slides after presenting the one or more images as one or more slides.

28. The method of claim 27 wherein receiving the one or more markups comprises receiving one or more shapes or comments from the user upon the one or more slides.

29. The method of claim 28 wherein presenting the one or more slides comprises presenting the one or more slides which include the one or more markups and the timestamp to the user.

30. The method of claim 18 further comprising categorizing the first image as a slide when the shape or text corresponds to the prior shape or text or categorizing the first image as a base image when the shape or text does not correspond to the prior shape or text.

31. The method of claim 18 further comprising searching the keywords in a single video summary based upon an input from the user.

32. The method of claim 18 further comprising searching the keywords in a plurality of the one or more video summaries based upon an input from the user.

33. The method of claim 24 further comprising searching the keywords in the summary based upon an input from the user.

34. The method of claim 25 further comprising searching the keywords in the transcript based upon an input from the user.

35. The method of claim 28 further comprising searching the keywords in the comments from the user upon an input from the user.

36. The method of claim 18 further comprising sharing the one or more video summaries with one or more additional users.

\* \* \* \* \*